Sept. 9, 1941.      M. TORNOW      2,255,135
SAFETY DEVICE FOR GAS SYSTEMS
Filed Aug. 5, 1938
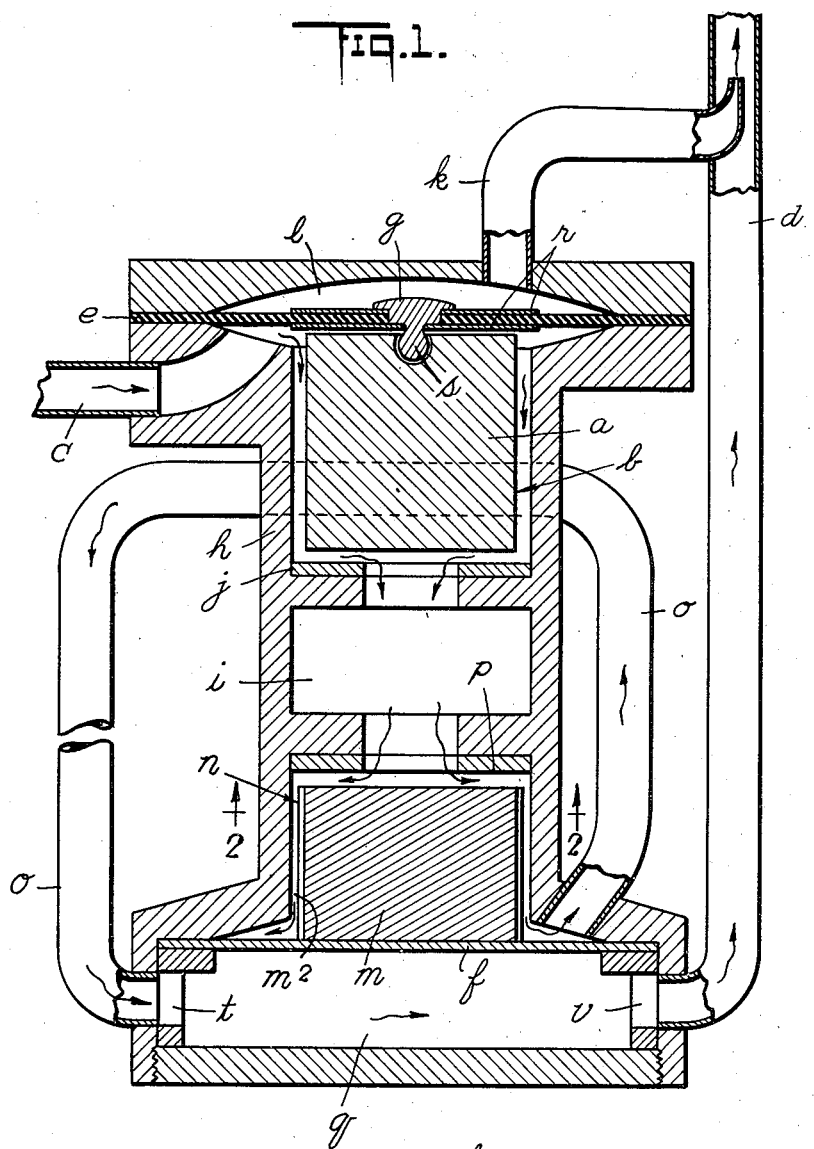
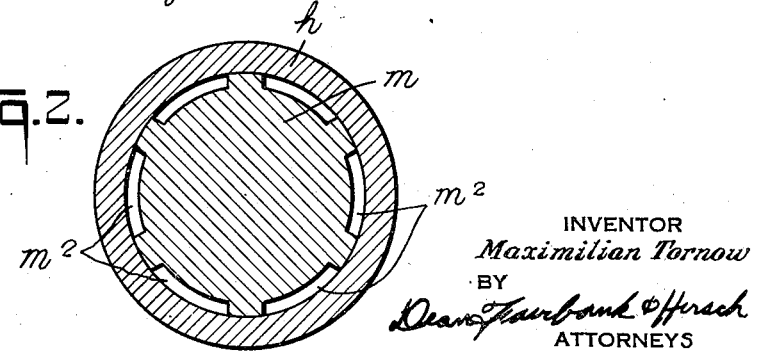
INVENTOR
Maximilian Tornow
BY
Dean Fairbank & Hirsch
ATTORNEYS Patented Sept. 9, 1941

2,255,135

UNITED STATES PATENT OFFICE 2,255,135

SAFETY DEVICE FOR GAS SYSTEMS

Maximilian Tornow, Berlin-Dahlem, Germany

Application August 5, 1938, Serial No. 223,273
In Germany February 1, 1936

10 Claims. (Cl. 48—192)

The present invention relates to safety valve devices for preventing back-firing of combustible gas or the back-creeping of oxygen through the piping to the combustible gas supply. An oxygen check valve of the diaphragm type is employed to prevent oxygen from backing up or creeping into the piping from the torch or blow pipe even at the lowest combustible gas pressures, and a back-firing check valve also of the diaphragm type is employed for preventing any explosion from back-firing into the generator or storage tank of the gas supply.

Among the objects of the present invention is to provide a new and improved safety valve design of the general type referred to, which is simple in construction, comparatively smaller than that formerly used for the same purpose, and safe in operation.

As a feature of the present invention the diaphragm of the oxygen check valve and the diaphragm of the back-firing check valve operable independently of each other. This renders the device safer in operation and simpler in construction. Furthermore, inasmuch as the diaphragms are independently operated, it is not necessary to make both of these of rubber or similar material. The diaphragm of the back-firing check valve may for instance be made of hard deformable material such as lead.

If the two diaphragms are connected so as to operate in unison, it is necessary for the smaller diaphragm controlling the oxygen check valve to be of sufficient size to counteract the resistance of the larger diaphragm controlling the back-firing check valve. By having the two diaphragms independently operated, the diaphragms may be made materially smaller. This reduction in size of the diaphragms is very important in cases of violent explosions, such as those which occur with acetylene, where pressures of more than 150 atmospheres are created.

Various other objects, features and advantages of the invention will be apparent from the following description and from an inspection of the accompanying drawing in which:

Fig. 1 shows somewhat diagrammatically a central longitudinal section through a form of safety device embodying the present invention, and Fig. 2 is a section taken on line 2—2 of Fig. 1.

In the specific embodiment of the invention shown, there is provided an inlet pipe c for the combustible gas leading from a gas storage holder or acetylene generator or other source, an outlet pipe d leading to the manifold to which the hoses of the torches or blow pipes are connected, and a safety valve device between these pipes including an oxygen check valve b on the inlet side of the device and a back-firing check valve n, these valves being interconnected in series by a gas passageway i.

The oxygen check valve b includes a valve body a slideable in a valve casing h, and heavily loaded so that it will be urged into closed position against the gas flow. This loading may be effected by the use of a spring acting on the valve body a or its diaphragm, or by making said valve body of such size as to provide the desired weight as shown in the drawing. In order to permit the passage of combustible gas through the valve b during normal operations, the valve body a has a diameter which is smaller than that of the inner periphery of the valve casing h to form a circumferential passage through which the gas may travel to the valve.

The bottom of the valve chamber enclosing the valve body is provided with an annular valve seat j which cooperates with the valve b and which forms therewith a gas sealed closure when said valve is in closed position.

During normal operations the valve body a is raised from the valve seat j to open position by the pressure of the incoming gas. For that purpose there is provided a diaphragm e made of rubber or similar flexible material, and suitably clamped in position around its periphery to define a chamber l above said diaphragm, and a chamber below the diaphragm into which the pipe c leads. The central portion of the diaphragm e is clamped between a pair of hard pressure-transmitting plates r secured to a center piece g, and is connected to the central portion of the valve body a by means of a hinge connection shown in the form of a ball coupling s, so that said valve body will automatically adjust itself in proper seating position on the valve seat j when the oxygen backs up into the safety device.

The chamber l is connected to the pipe d by means of a pipe k, having its end portion in said pipe d extending in the direction of flow of the gas in said latter pipe, and tapering toward a reduced opening, to subject said pipe k to an aspirating action, and to maintain the gas pressure acting on the upper side of the diaphragm e substantially less than that of the incoming gas acting on the under side of said diaphragm. The resultant difference in pressure on the diaphragm e will be sufficient to counteract the weight of the valve body $a$ and hold it in the open position shown in the drawing.

The back-firing check valve $n$ has a valve body $m$ resting on a diaphragm $f$, clamped around its periphery to the valve frame, and advantageously made of hard deformable matter such as lead so that it will be able to successfully withstand excessive explosive pressures.

The valve body $m$ is guided for vertical movement by the valve casing enclosing it, and has circumferentially spaced guide ridges and vertical slots $m^2$ on its periphery to form passageways through which the gas may travel toward the outlet pipe $d$. In closed position the valve $n$ in the upper end of the valve body $m$ cooperates with an annular valve seat $p$ to form a gas-tight closure. Thus the valve acts to close against the gas flow whereas valve $b$ closes with the gas flow.

Below the diaphragm $f$ there is provided a chamber $q$ having an inlet $t$ and an outlet $v$. The former is connected with the space above said diaphragm by a flame retardation pipe $o$. This may be long to provide the retardation or may be short with an obstruction therein. The outlet $v$ is directly connected to the delivery pipe $d$.

During normal operation of the safety device, the oxygen check valve $b$ will be in open position as already indicated, while the gas pressure on the upper side of the diaphragm $f$ plus the weight of the valve body $m$ will more than counterbalance the gas pressure on the lower side of the diaphragm $f$ and maintain the valve body $m$ in open position.

If oxygen should begin to back up into the piping system from the oxygen supply tank or other source, when the torch valves are closed, the resultant increased gas pressure transmitted through the pipe $k$ and acting on the upper side of the diaphragm $e$ will cause the valve $b$ to move to closed position on the valve seat $j$, and thereby check the further backing of the oxygen beyond said seat.

In case of an explosion in the piping system on the outlet side of the safety device, the increased pressure resulting from this explosion will act immediately on the underside of the diaphragm $f$ and move said diaphragm upwardly so that the valve $n$ will be moved to closed position. The flame resulting from the explosion and travelling through the pipe $o$ is retarded therein so that by the time it reaches the upper side of the diaphragm $f$ the valve $n$ will have been closed, thereby preventing the explosion flame from passing beyond the valve $n$. When the pressure in the pipe $d$ resulting from the back-firing or explosion, has dissipated, the pressure in pipe $c$ can again open the valve $b$ and the pressure on the upper side of the valve body $m$ plus the weight of said body may open the valve $n$ unless the diaphragm $f$ be too stiff in which case it may be necessary to take out the diaphragm $f$ and bend it back to its original shape.

Having thus described my invention, what I claim as new and desire to secure by Letters Patent is:

1. A safety device for preventing oxygen from backing up into a combustible gas piping system comprising a valve having a substantially horizontal diaphragm, a heavy valve body below said diaphragm, a hinge connection between said valve body and said diaphragm, for pivotally suspending said valve body from said diaphragm, a valve seat adapted to co-operate with the lower end of said valve body in closed position, and a valve casing surrounding said valve body and forming therewith a peripheral space, said space serving as a passageway for the gas through said valve, and permitting limited pivotal movement of said valve body in said casing about said hinge connection, an inlet adapted to lead combustible gas under pressure to the underside of said diaphragm, an outlet for the gases passing through said valve, and a pipe connection between said outlet and the space above the upper side of said diaphragm.

2. A device for preventing oxygen from backing up into a combustible gas piping system and for preventing back-firing into said system including an oxygen check valve loaded for closing action, a back-firing check valve, a pair of spaced diaphragms independently operable and bendable for controlling the operations of said valves respectively, and a flame retardation pipe between opposite sides of the diaphragm controlling the operation of the back-firing check valve, said latter diaphragm being clamped in position around its periphery, and forming an air-tight seal between the ends of said pipe.

3. A safety device for preventing oxygen from backing into a combustible gas piping system and for preventing back-firing into said system including an oxygen check valve on the inlet side of said device, a back-firing check valve in series with said oxygen check valve, a gas passageway between said valves, a pair of independently operable bendable diaphragms controlling the operations of said valves respectively, and sealably clamped around their peripheries, a gas connection interconnecting opposite sides of the diaphragm controlling the operation of said back-firing check valve, and disposed entirely on the outlet side of said oxygen check valve, and a separate gas connection between the outlet side of said latter diaphragm and the outlet side of said device, whereby an explosion on the outlet side of said device and in series with said first gas connection, will cause the resultant increased pressure to be transmitted to the outlet side of said last mentioned diaphragm to close said back-firing check valve.

4. A safety device for preventing oxygen from backing up into a combustible gas piping system and for preventing back-firing into said system, including an oxygen check valve and a back-firing check valve connected in series, a gas passageway between said valves, a pair of independently operable bendable diaphragms controlling the operations of said valves respectively, and sealably clamped around their peripheries, a flame retardation pipe interconnecting opposite sides of the diaphragm controlling the operation of said back-firing check valve, and a gas connection between the outlet side of said last mentioned diaphragm and the outlet side of said device whereby an explosion on the outlet side of said device will cause the resultant increased pressure to be transmitted to the outlet side of said last mentioned diaphragm to close said back-firing check valve.

5. A safety device for preventing back-firing into a combustible gas piping system including a back-firing check valve having a substantially horizontal bendable diaphragm sealably clamped around its periphery, a valve body supported on said diaphragm, and a valve seat above said valve body on the inlet side of said valve, a flame retardation pipe interconnecting the inlet and outlet sides of said diaphragm, an outlet for the gases passing through said valve, and a pipe connection between said outlet and the space on the lower outlet side of said diaphragm separate from but in series with said flame retardation pipe.

6. A safety device including an oxygen check valve on the inlet side of said device, a back-firing check valve in series with said oxygen check valve and disposed therebelow, said valves being movable in opposite closing position, and a pair of independently operable bendable diaphragms for controlling the operations of said valves, and sealably clamped around the peripheries thereof.

7. A safety device including a valve casing, an oxygen check valve in said casing having a substantially horizontal diaphragm, a valve body loaded downwardly for closing action and suspended from said diaphragm, an inlet communicating with the lower side of said diaphragm to subject said diaphragm to the inlet gas pressure in the opposite direction from the closing action of said valve, a pipe connection between the other side of said diaphragm and the outlet side of said safety device, a back-firing check valve in said casing connected in series with said oxygen check valve and having a substantially horizontal bendable diaphragm, in substantial axial alignment with said first mentioned diaphragm, and sealably clamped in position around its periphery, said second diaphragm being operable independently of said first diaphragm, and a valve body supported on said latter diaphragm, said last mentioned valve being operable in a direction opposite to said oxygen check valve toward closing position, a gas passageway between said valves, a flame retardation pipe for leading the gases from the inlet upper side of said second mentioned diaphragm to the outlet lower side thereof, and a connection between the outlet lower side of said latter diaphragm and the outlet of said safety device.

8. A safety device for preventing back-firing into a combustible gas piping system including a back-firing check valve having a substantially horizontal diaphragm of comparatively hard non-resilient deformable material, sealably clamped in position around its periphery, a valve body loosely supported on said diaphragm, a valve seat above said valve body on the inlet side of said valve, and a flame retardation pipe interconnecting the inlet and outlet sides of said diaphragm.

9. A safety device for preventing oxygen from backing into a combustible gas piping system and for preventing back-firing into said system including an oxygen check valve and a back-firing check valve connected in series, each of said valves including a valve body and a bendable diaphragm sealably clamped around its periphery for operating said body and means for delivering combustible gas through said oxygen check valve in the same direction as the direction of closing of its associated valve body and through said back-firing check valve in the direction contrary to the direction of closing of the valve body associated with the latter valve.

10. A safety device for preventing oxygen from backing up into a combustion gas piping system, and for preventing back-firing into said system, including a valve casing, an oxygen check valve in said casing on the inlet side of said device, a back-firing check valve also in said casing in series with said oxygen check valve, said valves including valve bodies in substantial co-axial alignment, axially movable in open or closed position, a gas passageway between said valves, a pair of independently operable diaphragms in substantial axial alignment, bendable to control the operations of said valves respectively, and sealably clamped around their peripheries, and a flame retardation pipe interconnecting opposite sides of the diaphragm controlling the operation of said back-firing check valve.

MAXIMILIAN TORNOW.